No. 843,863. PATENTED FEB. 12, 1907.
C. H. BOWMAN & C. B. McINTOSH.
BAIL FOR COOKING UTENSILS.
APPLICATION FILED JAN. 3, 1906.
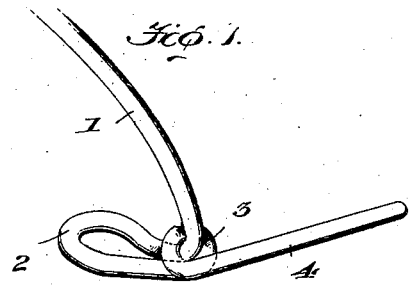
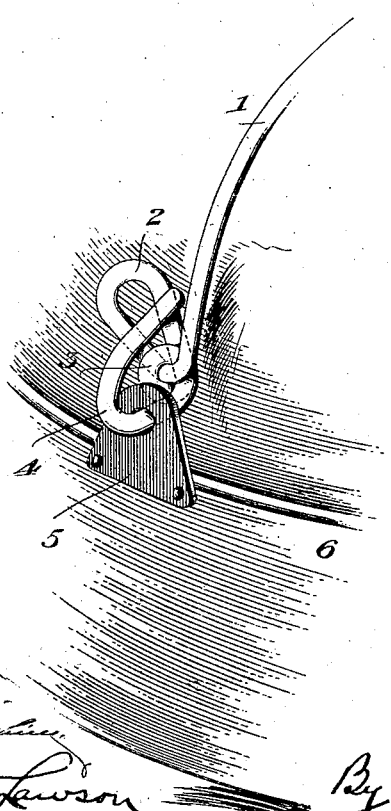

UNITED STATES PATENT OFFICE.

CHARLES H. BOWMAN AND CHARLES B. McINTOSH, OF LODI, WISCONSIN.

BAIL FOR COOKING UTENSILS.

No. 843,863.  Specification of Letters Patent.  Patented Feb. 12, 1907.

Application filed January 3, 1906. Serial No. 294,436.

*To all whom it may concern:*

Be it known that we, CHARLES H. BOWMAN and CHARLES B. McINTOSH, citizens of the United States, residing at Lodi, in the county of Columbia and State of Wisconsin, have invented certain new and useful Improvements in Bails for Cooking Utensils; and we do hereby declare the following to be a full, clear, and exact description of the invention, such as will enable others skilled in the art to which it appertains to make and use the same.

Our invention relates to bails for use in connection with cooking utensils; and its object is to provide a very simple device of this character which may be easily connected to the ears of ordinary utensils and which when so connected can be utilized for preventing the accidental displacement of the lids of utensils while the same are being drained of liquid contents.

Another object is to provide a bail which is of very simple and inexpensive construction.

With these and other objects in view the invention consists of a length of heavy wire bent at each end to form a laterally-extending loop, said loop terminating in a stem which is adapted to be inserted through one of the ears of a utensil and then bent upward, so as to form a secure fastening for the bail.

The invention also consists in further novel construction and combination of parts, more fully hereinafter described and claimed.

In the accompanying drawings we have shown the preferred form of our invention, and in said drawings—

Figure 1 is a perspective view of one end of our improved bail as it appears prior to being fastened to the ear of a utensil; and Fig. 2 is a similar view of the other end of the bail, the same being shown in engagement with an ear of a utensil.

Referring to the figures by numerals of reference, 1 is the bow or body portion of the bail, the same being preferably formed of a length of heavy wire. The end portions of the bail are exactly similar in form, and each consists of a laterally-extending loop 2, produced by bending the wire to one side and upon itself and then winding said wire once about one member of the loop to form an eye 3. The free end of the wire which extends from this eye constitutes a stem 4, which is adapted to be placed through the ear 5 of a utensil 6. The two stems 4 are substantially in alinement prior to being secured to a utensil.

The bails such as herein described are adapted to be placed upon the market as an article of manufacture, and when it is desired to place it in position upon the utensil the stems 4 thereof are inserted through the ears 5 from the inner sides thereof, after which said stems are bent upward, as shown in Fig. 2, so as to prevent accidental removal of the bail.

In view of the fact that the loops 2 extend laterally from the bail it will be understood that whenever said bail is swung in the direction of the loops said loops will be caused to move downward against the lid or cover of the utensil, and by firmly grasping the bail when in this position the lid can be maintained upon the utensil and will not slip therefrom while the liquid contents of the utensil are being poured off. Moreover, the loops 2 can be utilized for supporting the bail above and out of contact with the lid, thereby preventing it from becoming overheated and also holding it in a position where it may be readily grasped.

What we claim is—

1. The combination with a receptacle having ears extending therefrom; of a bail interposed between said ears and consisting of a single length of wire bent upon itself adjacent each end and at right angles to the bail to form laterally-retaining extending loops, each loop terminating in an eye formed by directing the free end of the wire around one section of the loop and stems projecting from the eyes and through the ears, said stems being bent upon themselves and overlapping the ears.

2. As an article of manufacture, a bail for cooking utensils formed of a single length of wire, a portion of which is directed at right angles near each end thereof and folded upon itself to form loops, each loop having an eye formed by directing the free ends of the wire around one section of the loop adjacent its juncture with the bail, and ear-engaging stems extending from the eyes.

In testimony whereof we have signed our names to this specification in the presence of two subscribing witnesses.

CHARLES H. BOWMAN.
CHARLES B. McINTOSH.

Witnesses:
S. C. PETERSON,
HERBERT PALMER.